(12) United States Patent
Deutschmeyer et al.

(10) Patent No.: US 11,278,826 B2
(45) Date of Patent: Mar. 22, 2022

(54) FILTER APPARATUS

(71) Applicant: HYDAC PROCESS TECHNOLOGY GMBH, Neunkirchen (DE)

(72) Inventors: Manfred Deutschmeyer, Perl (DE); Albert Kaints, Spiesen-Elversberg (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 209 days.

(21) Appl. No.: 16/494,366

(22) PCT Filed: Mar. 9, 2018

(86) PCT No.: PCT/EP2018/055973
§ 371 (c)(1),
(2) Date: Sep. 16, 2019

(87) PCT Pub. No.: WO2018/172106
PCT Pub. Date: Sep. 27, 2018

(65) Prior Publication Data
US 2020/0038788 A1 Feb. 6, 2020

(30) Foreign Application Priority Data
Mar. 18, 2017 (DE) .................... 10 2017 002 646.7

(51) Int. Cl.
*B01D 29/68* (2006.01)
*B01D 29/23* (2006.01)
*F16N 39/06* (2006.01)

(52) U.S. Cl.
CPC .......... *B01D 29/682* (2013.01); *B01D 29/23* (2013.01); *B01D 29/688* (2013.01);
(Continued)

(58) Field of Classification Search
None
See application file for complete search history.

(56) References Cited

U.S. PATENT DOCUMENTS

| 1,945,839 A | * | 2/1934 | Von Maltitz | ........... | B01D 29/23 |
| | | | | | 210/411 |
| 1,950,466 A | * | 3/1934 | Wille | ..................... | B01D 33/50 |
| | | | | | 210/392 |

(Continued)

FOREIGN PATENT DOCUMENTS

| DE | 34 43 752 | 6/1986 |
| DE | 39 20 097 | 2/1990 |

(Continued)

OTHER PUBLICATIONS

International Search Report (ISR) dated Jun. 27, 2018 in International (PCT) Application No. PCT/EP2018/055973.

*Primary Examiner* — Robert J Popovics
(74) *Attorney, Agent, or Firm* — Wenderoth, Lind & Ponack, L.L.P.

(57) ABSTRACT

A filter device has a filter housing (1) having a fluid inlet (11) for unfiltered matter, a fluid outlet (19) for filtered matter and at least one filter element (7, 9) of one or more parts accommodated in the filter housing (1). The filter element can be cleaned using at least one backwash element (21) in counter current to the direction of filtration. The backwash element can be moved by a fluid-conveying drive shaft (20) of a rotary drive at the inside (17) of the relevant filter element (7, 9). At the end adjacent to this inside (17), a gap-shaped passage opening is parallel to the axis of rotation (16) of the drive shaft (20) and opens into a flow chamber connected to the drive shaft (20) in a fluid-conveying manner. The distance between the backwash element (21) and the adjacent assignable filter element (7, 9) can be predetermined by an adjustment device (27; 47).

18 Claims, 9 Drawing Sheets

(52) U.S. Cl.
CPC .. *B01D 2201/082* (2013.01); *B01D 2201/287* (2013.01); *B01D 2201/30* (2013.01); *F16N 39/06* (2013.01)

(56) References Cited

U.S. PATENT DOCUMENTS

| | | | | |
|---|---|---|---|---|
| 1,968,741 A * | 7/1934 | Burrell | B01D 33/503 | 210/392 |
| 1,977,601 A * | 10/1934 | Winton | F16L 55/24 | 210/411 |
| 1,995,648 A * | 3/1935 | Rathbun | B01D 46/04 | 55/294 |
| 1,995,649 A * | 3/1935 | Rathbun | B01D 46/04 | 55/294 |
| 2,066,479 A * | 1/1937 | Macisaac | B01D 35/12 | 210/777 |
| 2,167,322 A * | 7/1939 | Cuno | B01D 29/52 | 210/392 |
| 2,275,958 A * | 3/1942 | Hagel | B01D 29/94 | 210/408 |
| 2,747,741 A * | 5/1956 | Jacobson | B01D 29/15 | 210/304 |
| 2,796,146 A * | 6/1957 | Hersey, Jr. | B01D 29/682 | 55/294 |
| 2,835,390 A * | 5/1958 | King | B01D 29/682 | 210/411 |
| 2,918,172 A * | 12/1959 | Kinney | B01D 33/067 | 210/392 |
| 3,017,029 A * | 1/1962 | Berninger | B01D 29/684 | 210/108 |
| 3,074,556 A * | 1/1963 | Rosaen | B01D 33/11 | 210/195.1 |
| 3,074,560 A * | 1/1963 | Kinney | D21D 5/06 | 210/330 |
| 3,168,467 A * | 2/1965 | Dreyer | B01D 29/606 | 210/108 |
| 3,256,995 A * | 6/1966 | Schmid | B01D 29/232 | 210/411 |
| 3,357,566 A * | 12/1967 | Schmid | B01D 29/54 | 210/333.01 |
| 3,393,262 A * | 7/1968 | Durso | B01D 29/23 | 264/188 |
| 3,574,509 A * | 4/1971 | Zentis | B01D 29/606 | 210/107 |
| 3,635,348 A * | 1/1972 | Carr | B01D 29/682 | 210/333.1 |
| 3,734,299 A * | 5/1973 | Akiyama | B01D 29/682 | 210/333.1 |
| 3,757,496 A * | 9/1973 | Berg | B01D 46/46 | 55/293 |
| 3,759,392 A * | 9/1973 | Syrjanen | B01D 29/336 | 210/415 |
| 3,784,016 A * | 1/1974 | Akiyama | B01D 29/54 | 210/333.1 |
| 3,784,017 A * | 1/1974 | Arnold | B01D 33/461 | 210/354 |
| 3,887,344 A * | 6/1975 | Smith | B01D 46/0065 | 55/294 |
| 4,220,458 A * | 9/1980 | Koppelman | B01D 39/06 | 55/283 |
| 4,251,237 A * | 2/1981 | Smith | B01D 46/0065 | 55/294 |
| 4,315,820 A * | 2/1982 | Mann | B01D 29/23 | 210/408 |
| 4,328,103 A * | 5/1982 | Kraeling, Jr. | B01D 29/232 | 210/411 |
| 4,358,370 A * | 11/1982 | Jameson | B01D 29/15 | 210/415 |
| 4,518,501 A * | 5/1985 | Lennartz | B01D 29/23 | 210/411 |
| 4,587,017 A * | 5/1986 | Christophe | B01D 29/413 | 210/323.1 |
| 4,592,838 A * | 6/1986 | Christophe | B01D 29/682 | 210/323.1 |
| 4,601,826 A * | 7/1986 | Christophe | B01D 29/413 | 210/340 |
| 4,610,786 A * | 9/1986 | Pearson | B01D 29/688 | 210/236 |
| 4,643,828 A * | 2/1987 | Barzuza | B01D 29/23 | 210/412 |
| 4,818,402 A * | 4/1989 | Steiner | B01D 29/23 | 210/411 |
| 4,867,879 A * | 9/1989 | Muller | B01D 29/035 | 210/392 |
| 5,087,365 A * | 2/1992 | Davis | B01D 29/118 | 210/415 |
| 5,152,891 A * | 10/1992 | Netkowicz | B01D 29/23 | 210/408 |
| 5,275,728 A * | 1/1994 | Koller | B01D 29/117 | 210/391 |
| 5,587,074 A * | 12/1996 | Lynch | B01D 29/23 | 210/411 |
| 5,632,903 A * | 5/1997 | Caracciolo, Jr. | B01D 29/682 | 210/741 |
| 5,824,229 A * | 10/1998 | Larkey | B01D 29/684 | 210/741 |
| 5,855,794 A * | 1/1999 | Caracciolo, Jr. | B01D 33/503 | 210/739 |
| 6,337,013 B1 * | 1/2002 | Koopmans | B01D 29/23 | 210/232 |
| 6,497,815 B1 * | 12/2002 | Koller | B01D 29/014 | 210/130 |
| 6,543,624 B1 * | 4/2003 | Geisbauer | B01D 29/15 | 210/411 |
| 7,258,238 B2 * | 8/2007 | Raghupathy | B01D 29/35 | 210/411 |
| 7,297,265 B1 * | 11/2007 | Booth | B01D 29/23 | 210/304 |
| 8,307,993 B2 * | 11/2012 | Yoshida | B01D 29/908 | 210/497.3 |
| 8,348,063 B2 * | 1/2013 | Pracher | B01D 46/0069 | 210/393 |
| 8,496,117 B2 * | 7/2013 | Leath, III | C02F 1/004 | 210/373 |
| 8,613,853 B2 * | 12/2013 | Eberle | B01D 35/147 | 210/104 |
| 8,678,199 B2 * | 3/2014 | Keller | B01D 29/54 | 210/411 |
| 9,211,489 B2 * | 12/2015 | Riggers | B01D 29/64 | |
| 9,561,454 B2 * | 2/2017 | Browning | B01D 29/035 | |
| 9,566,541 B2 * | 2/2017 | Konig | B01D 29/62 | |
| 9,616,363 B2 * | 4/2017 | Osman Oguz | B01D 29/94 | |
| 10,035,085 B2 * | 7/2018 | Cartarius | B01D 29/23 | |
| 10,058,806 B2 * | 8/2018 | Tange | B01D 33/50 | |
| 10,238,998 B2 * | 3/2019 | Cartarius | F02M 37/38 | |
| 10,245,531 B2 * | 4/2019 | Steiner | B01D 29/688 | |
| 10,646,801 B2 * | 5/2020 | Tameroglu | B01D 29/35 | |
| 10,688,419 B2 * | 6/2020 | Browning | B01D 29/682 | |
| 10,751,764 B2 * | 8/2020 | Dagan | B08B 5/04 | |
| 10,905,982 B2 * | 2/2021 | Holmen | B01D 29/688 | |
| 10,981,092 B2 * | 4/2021 | Lingen | B01D 29/232 | |
| 2007/0199885 A1 | 8/2007 | Shmuel et al. | | |
| 2008/0047885 A1 * | 2/2008 | Shiekelmacher | B01D 29/23 | 210/107 |
| 2008/0053889 A1 * | 3/2008 | Leath | B01D 33/503 | 210/403 |
| 2010/0038295 A1 * | 2/2010 | Keller | B01D 29/54 | 210/145 |
| 2010/0096310 A1 * | 4/2010 | Yoshida | B01D 29/23 | 210/151 |
| 2010/0163480 A1 * | 7/2010 | Pracher | B01D 29/682 | 210/411 |
| 2012/0111788 A1 * | 5/2012 | Leath, III | B01D 33/463 | 210/409 |
| 2012/0223028 A1 * | 9/2012 | Dagan | B08B 5/04 | 210/791 |
| 2013/0087495 A1 * | 4/2013 | Riggers | B01D 29/682 | 210/415 |

(56) References Cited

U.S. PATENT DOCUMENTS

| | | | | |
|---|---|---|---|---|
| 2013/0126408 A1* | 5/2013 | Konig | | F01M 11/03 |
| | | | | 210/175 |
| 2013/0306546 A1* | 11/2013 | Cartarius | | B01D 29/117 |
| | | | | 210/411 |
| 2014/0091021 A1* | 4/2014 | Wnuk | | B01D 29/52 |
| | | | | 210/108 |
| 2014/0097145 A1* | 4/2014 | Browning | | B01D 29/682 |
| | | | | 210/780 |
| 2016/0151726 A1* | 6/2016 | Cartarius | | B01D 29/668 |
| | | | | 210/411 |
| 2016/0214039 A1* | 7/2016 | Tameroglu | | B01D 29/6446 |
| 2016/0367917 A1* | 12/2016 | Steiner | | B01D 29/23 |
| 2017/0014736 A1* | 1/2017 | Osman Oguz | | B01D 29/606 |
| 2017/0128860 A1* | 5/2017 | Cartarius | | B01D 29/684 |
| 2017/0144087 A1* | 5/2017 | Browning | | B01D 29/682 |
| 2017/0349450 A1* | 12/2017 | Tange | | C02F 1/004 |
| 2019/0193126 A1* | 6/2019 | Dagan | | B08B 5/04 |
| 2019/0240600 A1* | 8/2019 | Lingen | | B01D 35/005 |
| 2019/0381430 A1* | 12/2019 | Lingen | | B01D 29/58 |
| 2019/0388808 A1* | 12/2019 | Takahashi | | B01D 29/64 |
| 2020/0038787 A1* | 2/2020 | Schlichter | | B01D 35/005 |
| 2020/0038788 A1* | 2/2020 | Deutschmeyer | | B01D 29/23 |
| 2020/0155980 A1* | 5/2020 | Holmen | | B01D 29/686 |
| 2020/0230531 A1* | 7/2020 | Tange | | B01D 33/06 |
| 2021/0023482 A1* | 1/2021 | Eisen | | B01D 29/23 |
| 2021/0106931 A1* | 4/2021 | Holmen | | B01D 29/688 |
| 2021/0170312 A1* | 6/2021 | Schlichter | | B01D 29/52 |

FOREIGN PATENT DOCUMENTS

| | | |
|---|---|---|
| DE | 44 23 812 | 1/1996 |
| DE | 10 2009 010 255 | 8/2010 |
| DE | 20 2016 003 089 | 7/2016 |
| EP | 2 544 789 | 4/2016 |

* cited by examiner

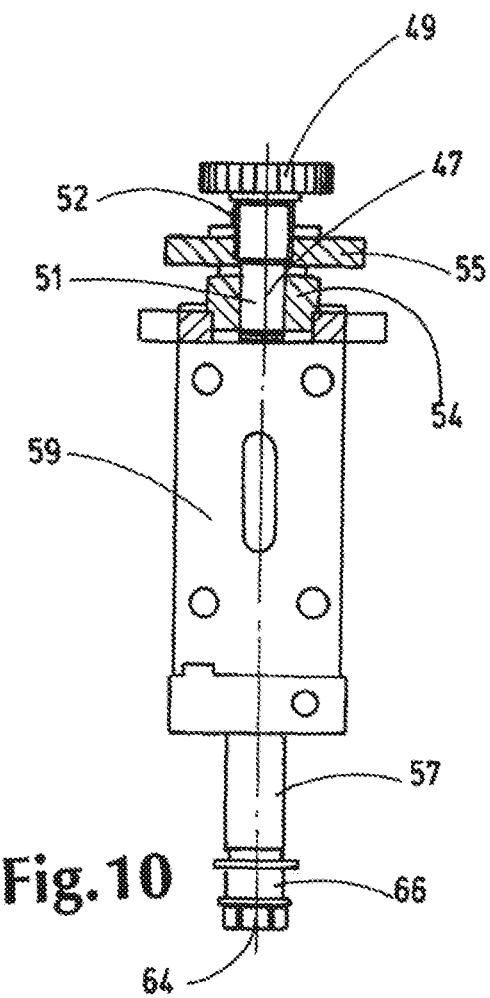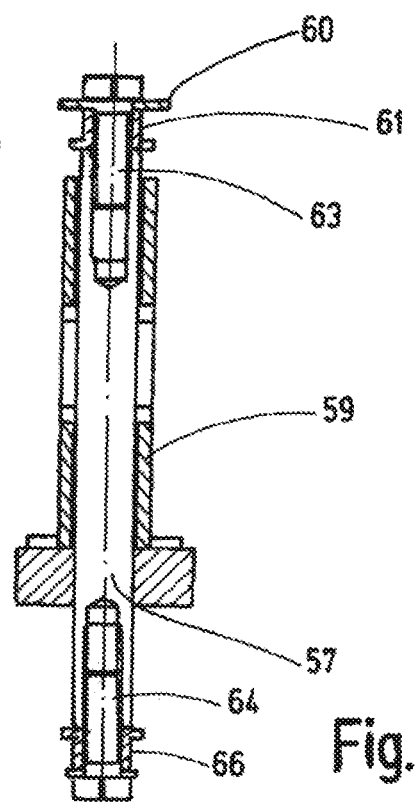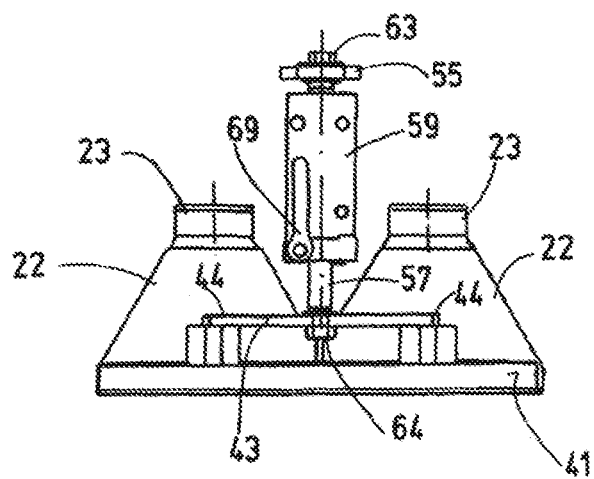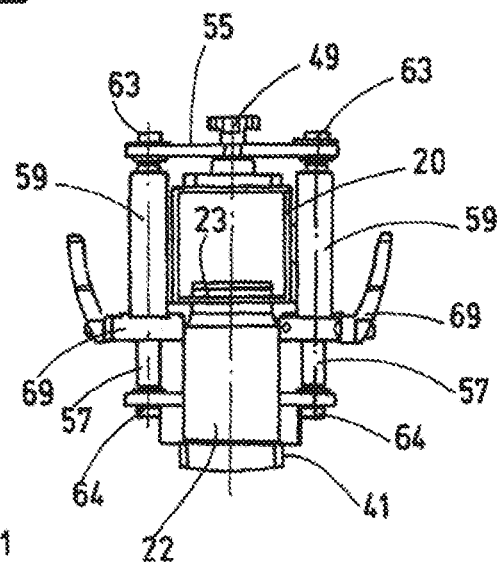

FILTER APPARATUS

FIELD OF THE INVENTION

The invention relates to a filter device having a filter housing with a fluid inlet for unfiltered matter and a fluid outlet for filtered matter. At least one filter element of one or more parts is accommodated in the filter housing, which filter element can be cleaned using at least one backwash element in counter current to the direction of filtration. The backwash element can be moved by a fluid-conveying drive shaft of a rotary drive at the inside of the relevant filter element and has, at the end adjacent to this inside, a gap-shaped passage opening. The passage opening is parallel to the axis of rotation of the drive shaft and opens into a flow chamber connected to the drive shaft in a fluid-conveying manner.

BACKGROUND OF THE INVENTION

The perfect condition of the lubricating oil is of great importance for the operational safety and service life of internal combustion engines. In particular, the continuous operation of diesel engines, which are operated using heavy fuel oil for instance in maritime applications, makes particularly high demands at the characteristics of the lubricating oil, i.e. the use of filter devices for lubricating oil purification is essential in such applications. In this regard, it is state of the art to use filter devices, in which filter cartridges are backwashed to allow longer run times between changes of filter cartridges and to keep maintenance costs low in that way. As examples of the related state of the art, the documents DE 34 43 752 A1 and DE 10 2016 012 206 U1 show filter devices of the type mentioned above.

SUMMARY OF THE INVENTION

Based at this state of the art, the invention addresses the problem of providing a filter device of the type mentioned at the outset, which is characterized by a high efficiency of cleaning and a particularly high level of operational reliability.

According to the present invention, this object is basically achieved by a filter device having, as a significant feature of the invention, the distance between the backwash element and the adjacent assignable filter element being predetermined by an adjustment device. The option of adjusting the backwash element to the relevant filter element provides tolerance compensation, which permits an optimum distance-free contact of the gap-shaped passage opening of the respective backwash element at the wall of the filter material, even for deviations within the usual tolerance ranges. As a result, the filter device according to the invention is distinguished not only by a particularly high efficiency of cleaning achieved during the backwashing process, but also by a high degree of operational reliability.

In advantageous exemplary embodiments, the adjusting device has a spindle drive, which can be actuated manually from one side of the drive shaft and has adjustment means acting at the other side of the drive shaft at the respective backwash elements.

Advantageously, the arrangement may in this case be such that the spindle of the spindle drive executing its adjustment motion extends through the inner fluid guide of the drive shaft and its end extending through the drive shaft forms the part of the adjustment means acting at the individual backwash element.

Alternatively, the adjustment means that can be moved by the spindle drive can be guided past outsides of the drive shaft. The ends of the adjustment means routed to the other side also act on the backwash element.

The backwash element may have a receiving housing, with which the spindle drive engages with its respective adjustment means and in which the at least two partial backwash elements are accommodated. One fluid guide is assigned to every partial element, which, guided longitudinally, engages in every traversing position of the receiving housing with the internal fluid guide of the drive shaft. The fluid guides of the partial elements can be formed by telescopically movable pipe parts, with one pipe part connected to the relevant partial element and the other pipe part connected to the inner fluid guide of the drive shaft.

In embodiments, in which the spindle drive is fed through the drive shaft, its respective adjustment means can act on the receiving housing between the fluid guides of a pair of partial elements.

In the case of adjustment means guided laterally past the drive shaft, the respective adjustment means for every partial element may be movably guided in every guide housing mounted at the outside of the drive shaft. A spring element acts as a further adjustment means providing additional adjusting force between these guide housings and adjacently arranged housing parts of the receiving housing.

Advantageously, the arrangement can be made such in this case that the relevant spring element permits compensating motions of the receiving housing relative to the gap-shaped passage opening of the relevant partial element. The adjustment thus forms a kind of "pendulum device", which permits an additional angle compensation.

In a particularly advantageous manner, the compensating motion can occur in parallel to the adjusting direction of the relevant adjustment means of the spindle drive or at a tilt angle, for which the receiving housing is tilted to adjust a partial element at least partially more in the direction of the adjacent filter element as the other partial element of a pair moves away from the element.

A prestressed compression spring can be used for a parallel adjusting motion, and for a tilting motion. An elastically yielding sealing element, which comprises the fluid guide of the partial element when entering the internal fluid guide of the drive shaft, can be used.

In advantageous exemplary embodiments, a receiving plate interacting with the spindle drive is used to implement the tilting motion. The free ends of the receiving plate are connected to the receiving housing and, while maintaining a distance, at least partially comprises the receiving housing, viewed in the direction of the drive shaft.

In exemplary embodiments having adjustment means of the spindle drive laterally guided along the drive shaft, the arrangement may be advantageously made such that the receiving plate is connected to two rods assigned to the spindle drive. The two rods are guided in the outer guide housings located at the drive shaft and can be attached to the guide housing by a toggle drive to lock the adjustment in place.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 8 is a side view of a backwash element with an assigned adjustment device of the second exemplary embodiment, in a separate representation without a drive shaft, drawn at a smaller scale;

FIG. 9 is a plan view of the backwash element of FIG. 8 mounted at the drive shaft shown in cross section;

FIGS. 10 and 11 are a side view and an end view in section of the spindle drive of the guide housing assigned to adjustment device of the second exemplary embodiment;

DETAILED DESCRIPTION IN THE INVENTION

Figure 1:
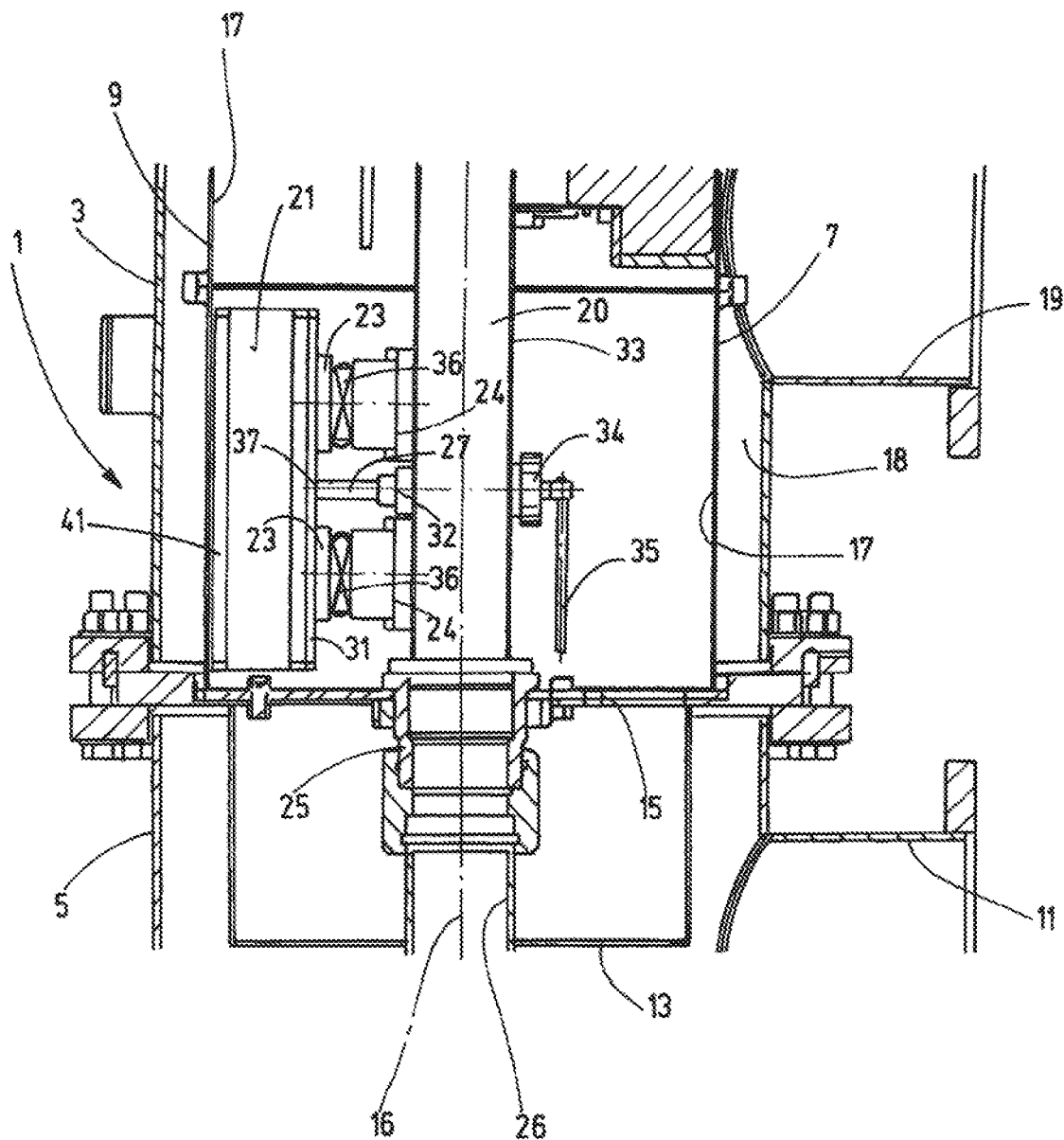
FIG. 1 is a partial side view in section of a filter device according to a first exemplary embodiment of the invention, drawn slightly offset from the center plane.

FIGS. 1 to 4 show a first exemplary embodiment of the filter device according to the invention. It has a filter housing 1, the construction of which corresponds to the relevant, mentioned prior art (cf. FIG. 1 of the mentioned DE 202016003089 U1). The truncated representations of the filter housing 1 in FIGS. 1 to 4, therefore, show only a part of the housing main part 3 and of a downwardly adjoining housing bottom part or entry part 5. A first filter element 7 and a second overlying filter element 9 are arranged in the main part 3. For the filter elements only the lower one is completely visible. At the bottom part 5, there is a lateral inlet 11, through which the unfiltered matter flows into the bottom part 5. After flowing through an input filter 13, which is provided in maritime applications as a fish trap, the unfiltrate flows into the inner cavities of the filter elements 7 and 9 via passages 15. Each cavity is encompassed by the inside 17 of filter material(s) of the filter elements. During the filtration process, the fluid flows from the inside to the outside through the filter material. The filtered fluid reaches the chamber 18 encompassing each of the filter elements 7, 9, which chamber forms the filtered side in the main part 3, from which it flows off via a lateral outlet 19 as filtrate.

Figure 3:
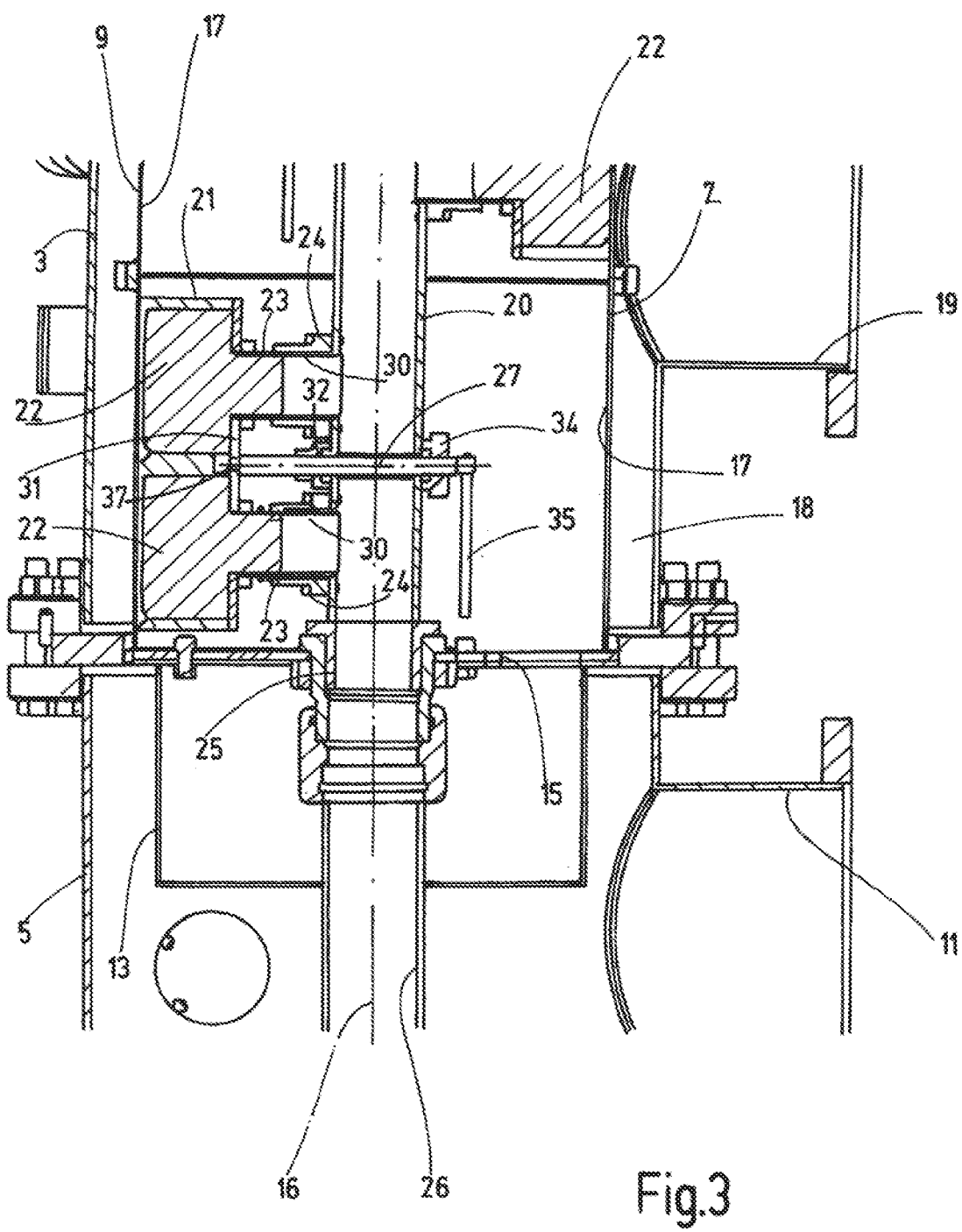
FIG. 3 is a partial side view in section of the filter device part shown in FIGS. 1 and 2 in a central sectional plane.
Figure 4:
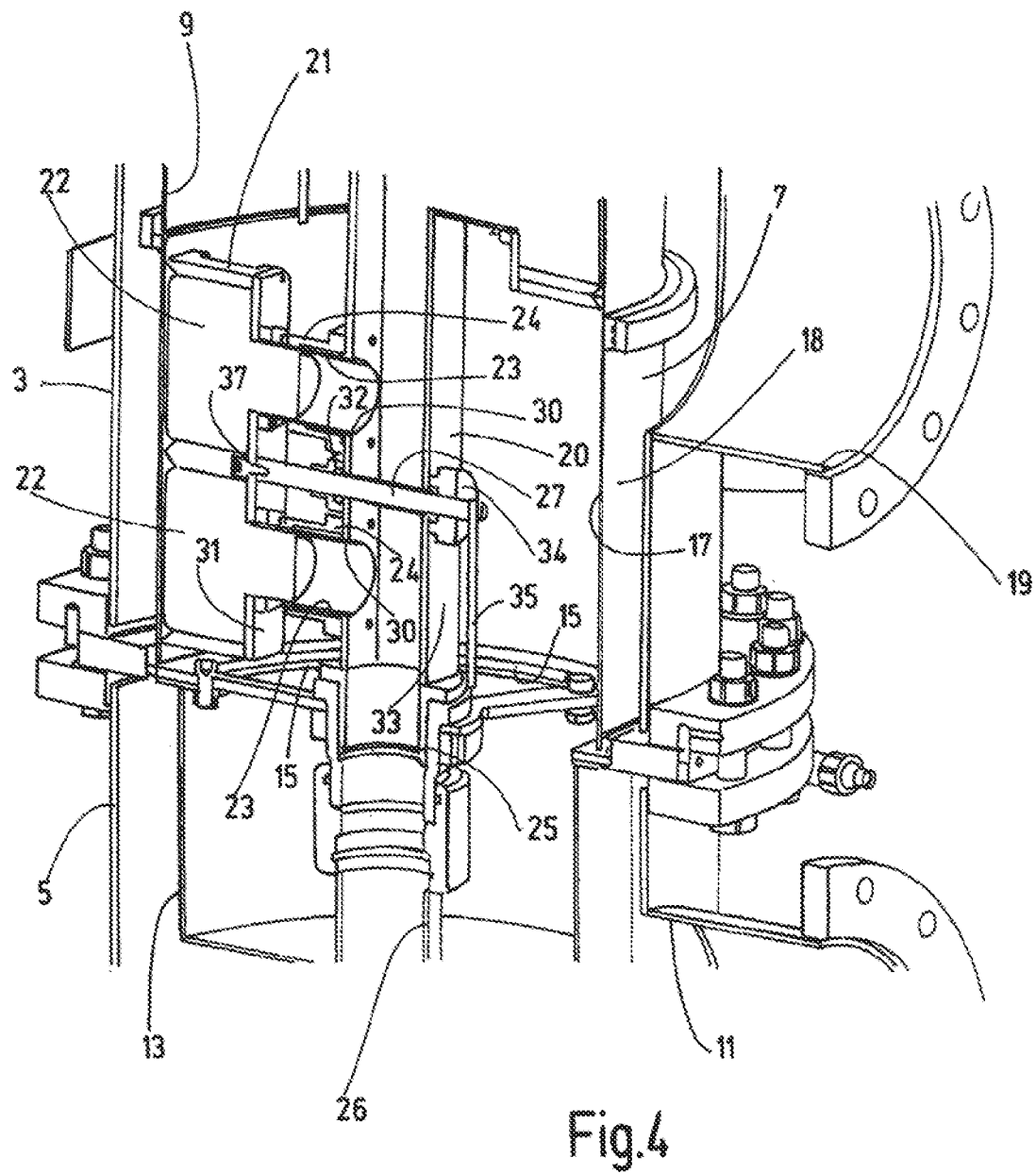
FIG. 4 is a partial perspective view of the filter device part of FIGS. 1 to 3 cut along the central plane.

As usual in the state of the art, a backwash element is provided for every filter element 7 and 9 at a drive shaft 20 formed by a square tube, which contains two partial backwash elements 22 arranged one above the other in a receiving housing 21 (FIGS. 3 and 4). The partial elements 22, which are state of the art and therefore only schematically outlined in the figures, are formed in the usual way by a type of scraper. The slot-shaped passage openings of elements 27 extend parallel to the axis of rotation of the drive shaft 20 and are guided along the inside 17 of the filter elements 7, 9 in contact with the filter elements during a rotational motion of the drive shaft 20. The passage openings continue in the interior of the partial elements 22 in a flow chamber, which is connected to the interior of the drive shaft 20 via one fluid guide 23 each. These fluid guides 23 are guided longitudinally in a telescopic manner in a connector part 24 located at the drive shaft 20. The drive shaft 20 can be driven according to the state of the art and is rotatably mounted. Only one lower pivot bearing 25 of the bearings is visible, at which the lower end of the drive shaft 20 transitions into a sludge discharge pipe 26.

An adjustment device or adjustable connection having a spindle drive is provided for adjusting the receiving housing 21 having the backwash elements 22, i.e. for the adjustment of the distance of the gap-shaped passage openings of the partial elements 22 of the rotation axis 16 of the drive shaft 20. The spindle drive has, in the example of FIGS. 1 to 4, a threaded spindle 27 which can be fed through the drive shaft 20 in the direction perpendicular to the rotation axis 16. The threaded spindle 27 forms an adjusting means. The end of spindle 27 facing the receiving housing 21 is connected to the receiving housing 21 in the middle between the partial elements 22. The receiving housing 21 has the shape of a bar-shaped body having long sides 28 and 29 (FIG. 2), which extend in parallel to the axis of rotation 16 of the drive shaft 20. The partial elements 22 are arranged one above the other inside the receiving housing 21. The vertical axis is arranged in alignment between the long sides 28, 29. The fluid guides 23 of the partial elements 22 have an output tube 30 at the fluid guide 23, which, cf. FIGS. 3 and 4, is telescopically guided in the associated connector part 24 of the drive shaft 20. The end of the threaded spindle 27 facing the receiving housing 21 is connected to a plate 31 of the receiving housing 21, which forms the end wall of the receiving housing 21 facing the drive shaft 20. The connection point 37 to the spindle drive 27 is in the middle between the fluid guides 23. For the position adjustment of the threaded spindle 27, as shown most clearly in FIG. 4, a nut 32 is attached to the outside of the drive shaft 20 facing the receiving housing 21, which is in threaded engagement with the external thread of the threaded spindle 27. On the opposite outer side 33 of the drive shaft 20, a knurled nut 34 is in threaded engagement with the external thread of the threaded spindle 27. A manually operable rotary lever 35 is located at the free end of the threaded spindle 27 projecting beyond the knurled nut 34.

Figure 2:
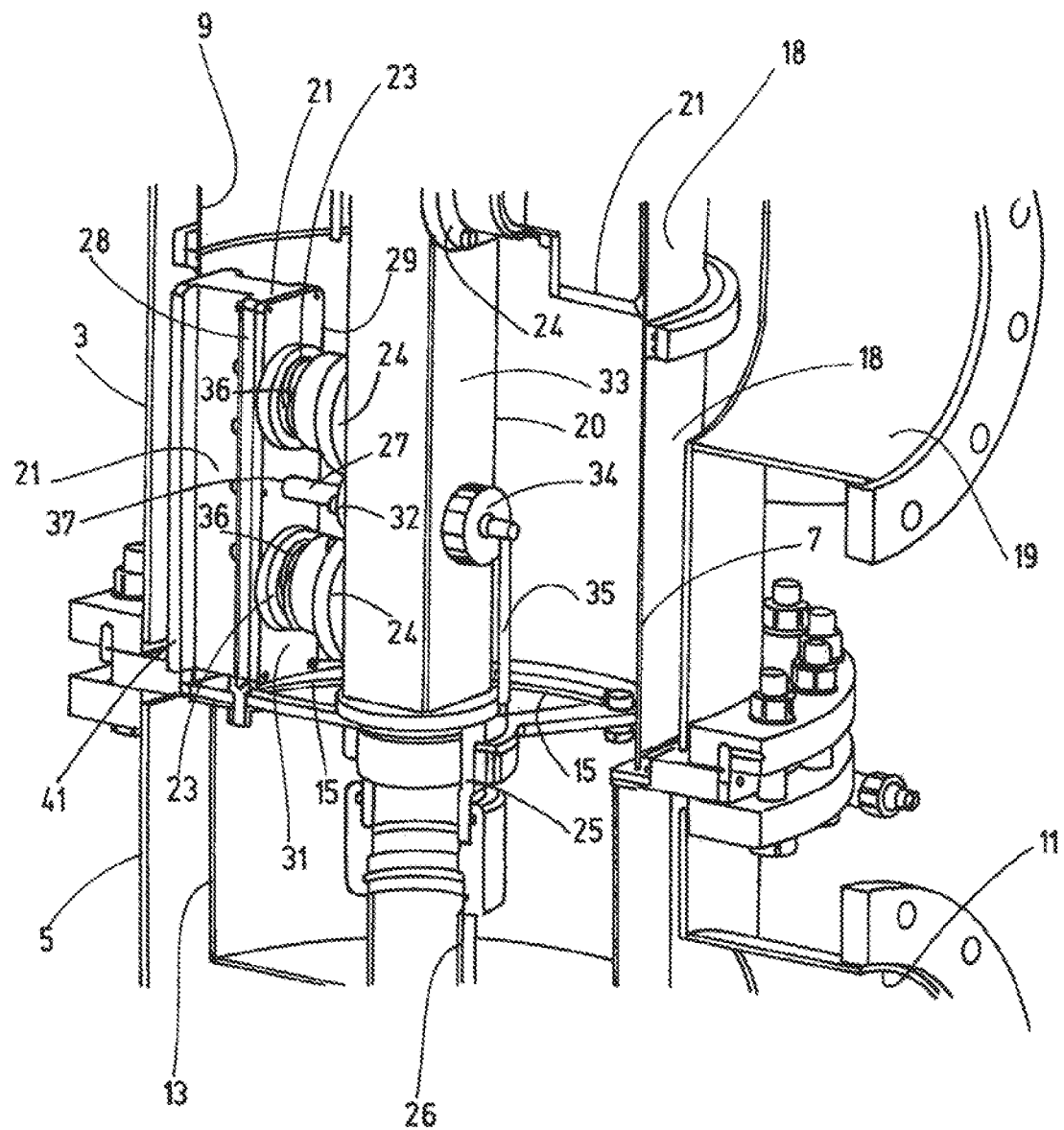
FIG. 2 is a partial perspective view of the filter device part shown in FIG. 1, with its housing wall cut open.

The connection 37 of the end of the threaded spindle 27 to the plate 31 of the receiving housing 21 is designed such that the spindle 27 can be rotated relative to the receiving housing 21, but the spindle 27 limits the radially outwardly extended position of the receiving housing 21. This position can be adjusted in that for a not tightened knurled nut 34 when the threaded spindle 27 is rotated by the lever 35 due to the threaded engagement with the nut 32, the axial position of the spindle 27 and thus the fully extended end position of the receiving housing 21 are set. By tightening the knurled nut 34, the rotational position of the spindle 27 is secured and the setting is locked. If, as shown in FIGS. 1 and 2, a spring element 36 is inserted at the fluid guides 23 of the partial elements 22, the spring elements stress the receiving housing 21 radially outwards. The connection 37 between the spindle 27 and the plate 31 is advantageously implemented as a type of floating bearing, which limits a motion of the receiving housing 21 radially outwardly in a form-fitting manner, but permits a tilting motion of the receiving housing 21 about an axis transverse to the main axis and optionally provides an axial clearance for a spring travel that is directed radially inwards.

Figure 5:
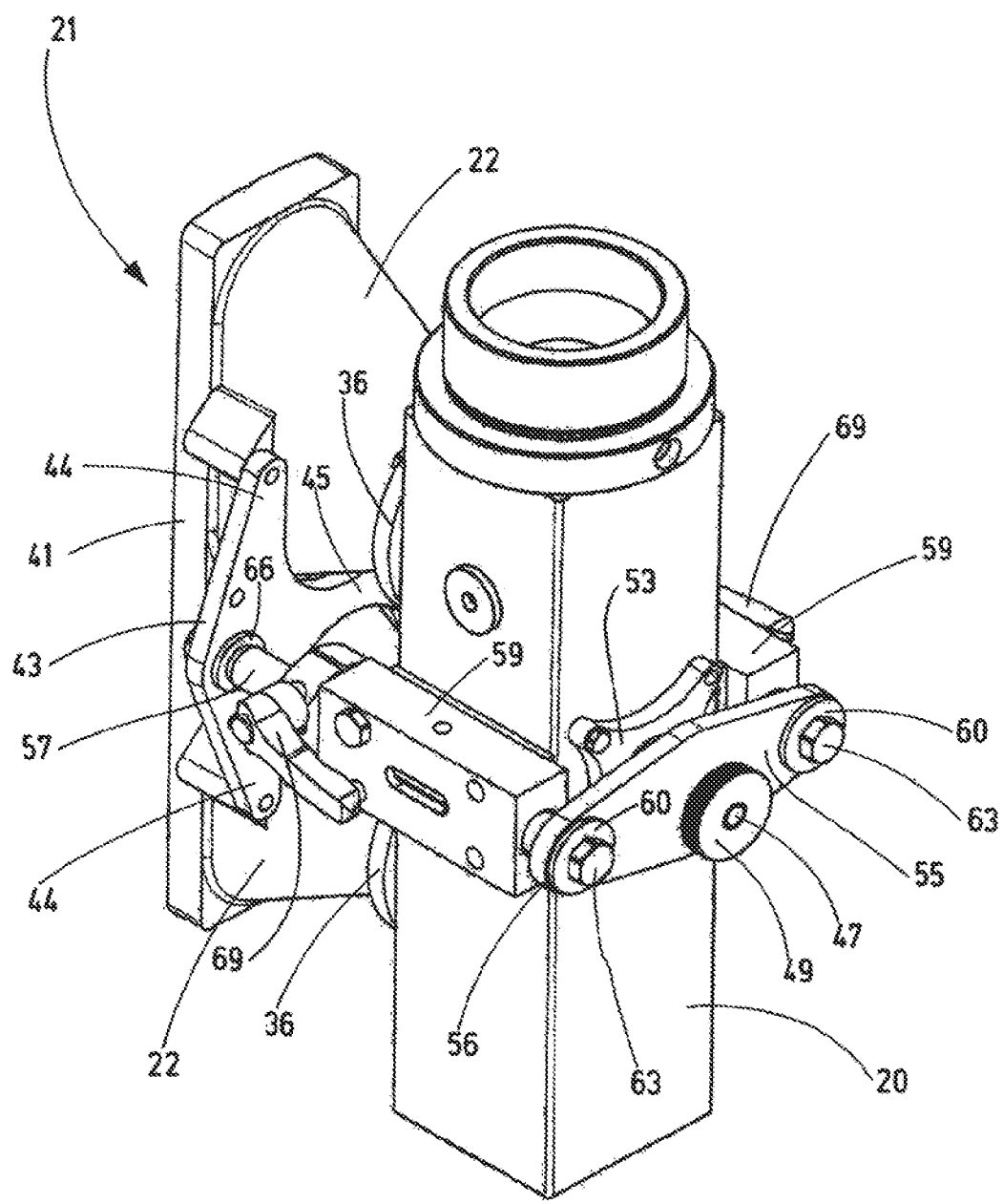
FIG. 5 is a perspective view of a longitudinal section of the drive shaft and of a backwash element located thereon of a filter device according to a second exemplary embodiment of the invention.
Figure 6:
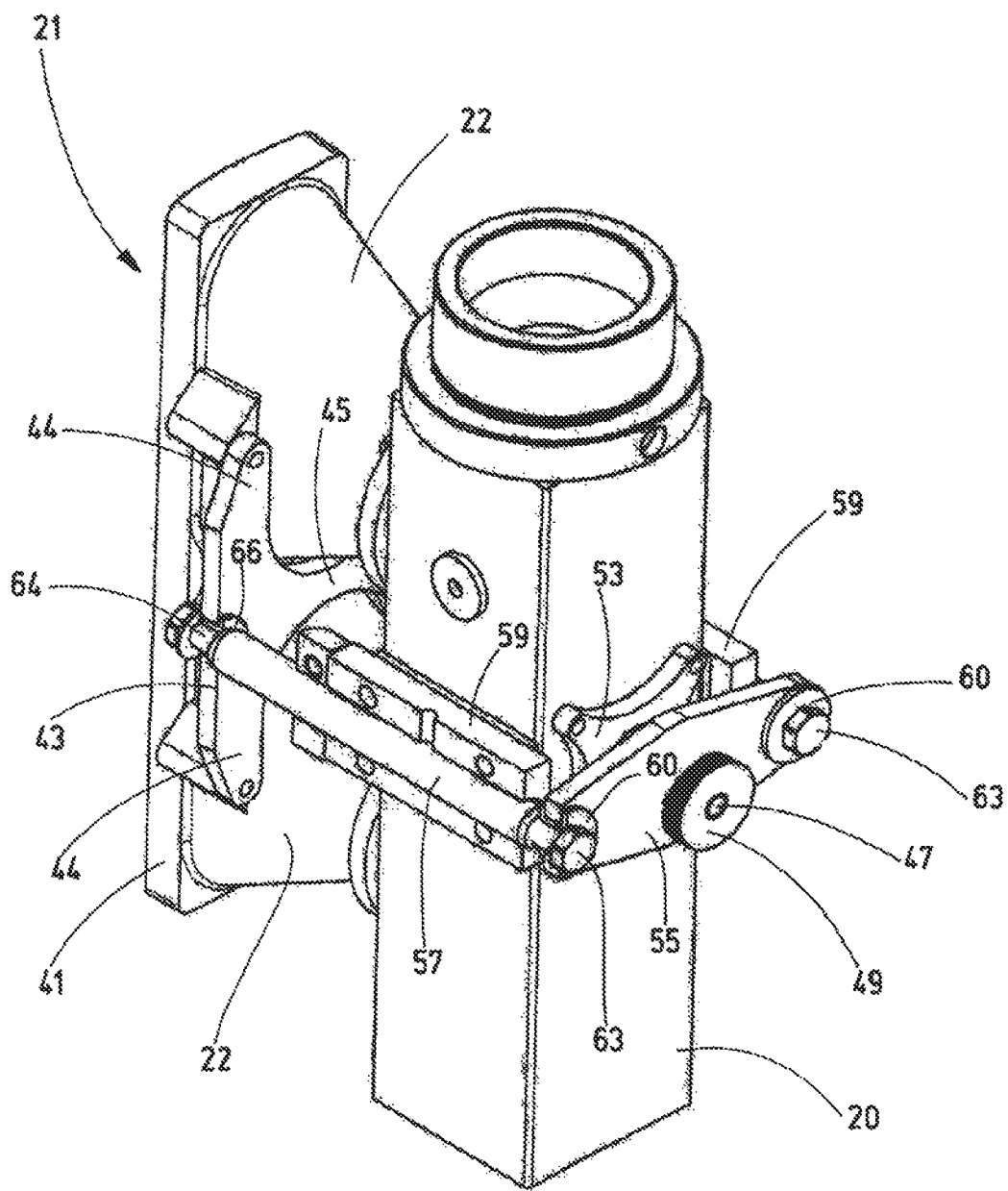
FIG. 6 is a perspective view of the filter device part of the second exemplary embodiment shown in FIG. 5, wherein device parts are drawn cut away in the area of a guide housing located laterally at the drive shaft.
Figure 7:
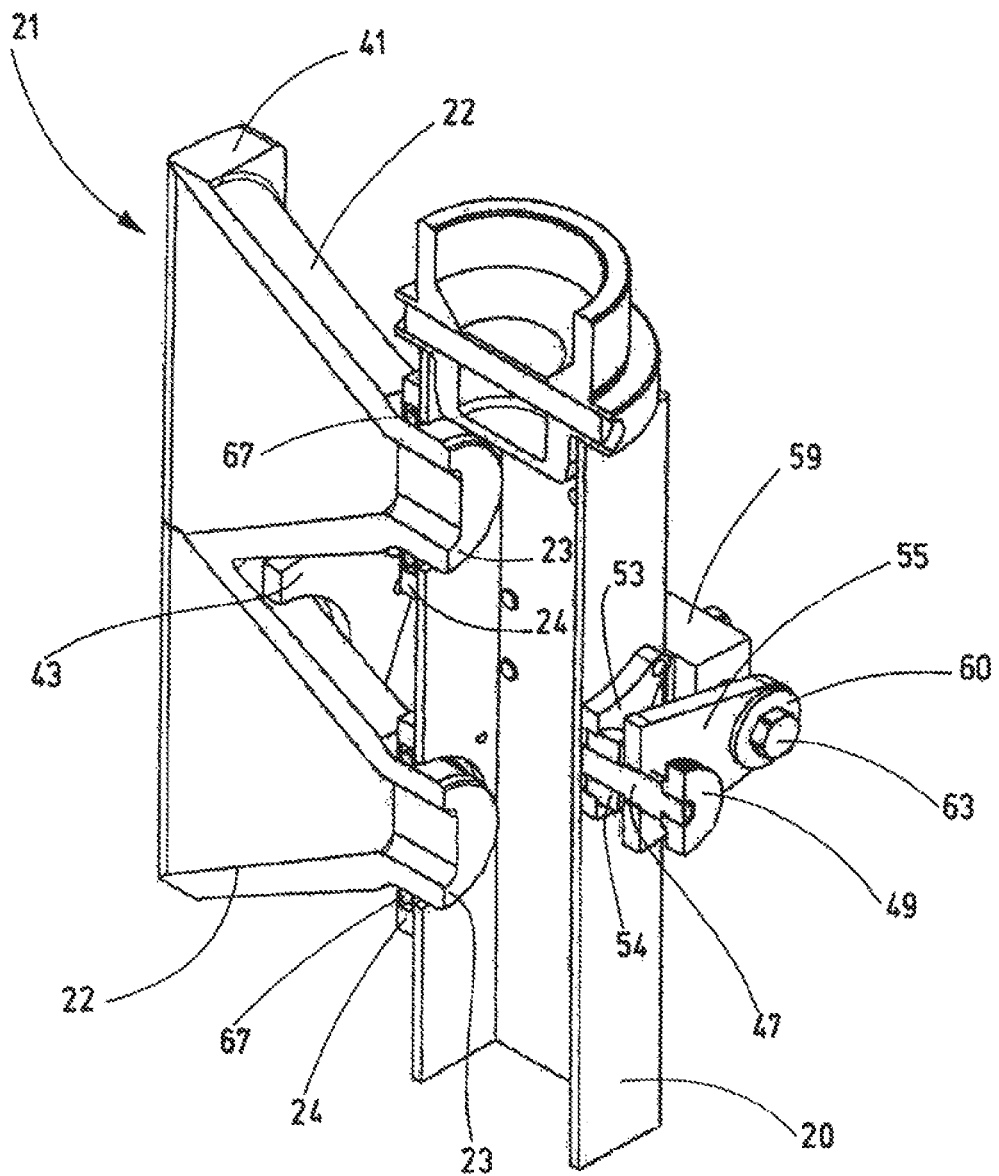
FIG. 7 is a perspective view of the filter device part of the second exemplary embodiment, cut-away in a central vertical plane.

The second exemplary embodiment shown in FIGS. 5 to 15 in particular provides compensating and tilting motions. As in the first exemplary embodiment, the adjustment device has a spindle drive, which can be actuated manually from the outside of the drive shaft 20. Unlike the first example, the receiving housing 21 of the partial elements 22 does not have the form of a beam-shaped bar body, but its outer shape is formed by the two superposed flow funnels of the partial backwash elements 22. The flow funnels are interconnected by a front plate 41 at the radially outer side. To interact with the spindle drive, a receiving plate 43 extending in parallel to the end plate 41 is provided. Receiving plate 43 has lateral wings 44, which partially encompass the partial elements 22 and are interconnected via a central web 45 extending through the gap between the partial elements 22. The ends of the wings 44 are each firmly connected to the end plate 41 of the receiving housing 21. Another difference to the example of the first embodiment is that the threaded spindle of the spindle drive is not fed through the drive shaft 20. As most clearly shown in FIG. 7 in conjunction with FIGS. 5 and 6, a threaded spindle in the form of a pressure screw 47 is provided, which has a knurled head 49. Knurled head 49 allows a manual rotational adjusting motion. As FIG. 10 shows, the pressure screw 47 has a non-threaded end section 51 and a threaded section 52. The non-threaded end section 51, which can be rotated in a guide body 54, is supported at its free end at a pressure plate 53, which is located at the outside of the drive shaft 20. The threaded portion 52 is in threaded engagement with an internal thread in a cross bar 55. The cross bar 55 extends beyond the width of the facing outside of the drive shaft 20, and its protruding ends form the connection points for a rod 57. These rods 57 are each longitudinally guided in a guide housing 59 in a direction perpendicular to the axis of rotation 16 of the drive shaft 20. As shown in FIGS. 5 and 6 in conjunction with FIGS. 10 and 11, a fastening bolt 63 penetrates a sleeve 61 and an annular disc 60 at the respective connections of the cross bar 55 to the rods 57. In a corresponding manner, the other end of the rods 57 is connected to the receiving plate 43 by a bolt, at a position that is located centrally between the ends of the wings 44. In this bolted connection, a fastening bolt 43 extends through an elastomeric sleeve body 66, such that a flexible support of the receiving housing 21 is formed relative to the drive shaft 20 on the receiving plate 43.

Figures 13, 14:
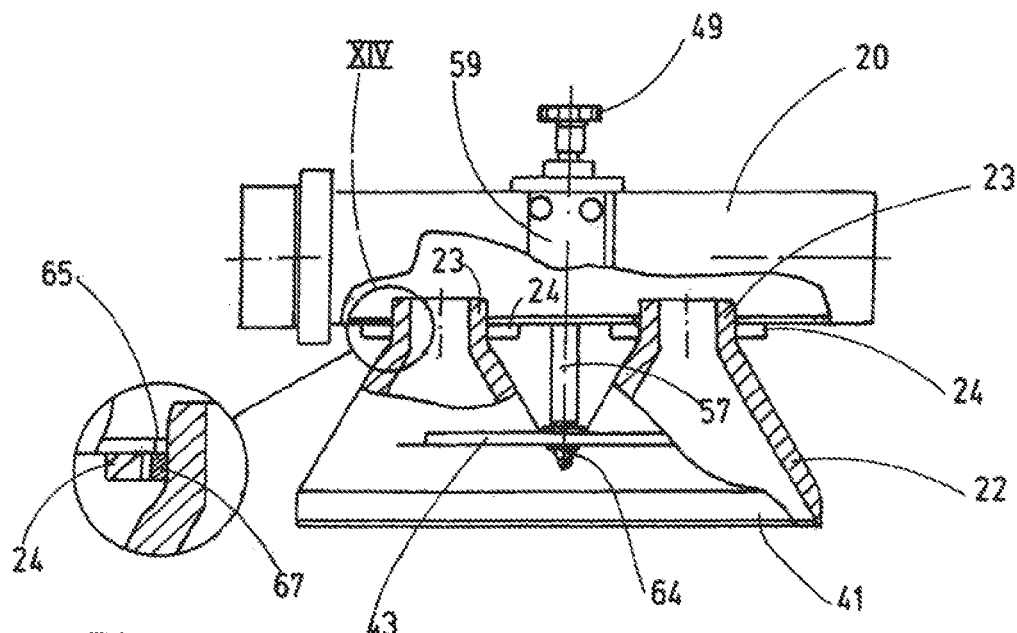
FIG. 13 is a side view of FIG. 12 in a partially broken-away and sectioned drawing.
FIG. 14 is an enlarged partial side view in section of the area designated XIV in FIG. 13.
Figure 12:
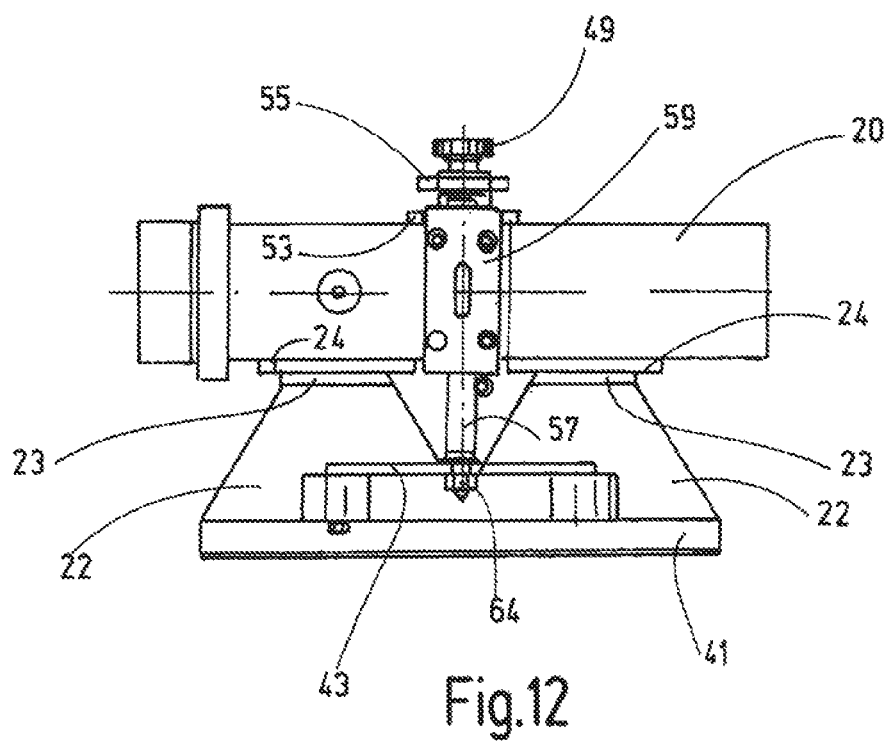
FIG. 12 is a side view of a longitudinal section of the drive shaft of the second exemplary embodiment having a backwash element located thereon.

As in the first exemplary embodiment, the fluid guides 23 of the sub-elements 22 are guided in a telescopically displaceable manner in the assigned connector part 24 of the drive shaft 20. As with the connection between the rods 57 and the receiving plate 43 of the receiving housing 21, where a flexible support 66 is formed by the elastomeric sleeve body used, a flexible guide is also provided in the guide of the fluid connections 23 in the connecting parts 24 of the drive shaft 20. As can be seen in FIGS. 13 and 14, a radial play (see FIG. 14 at 65) is provided between the fluid guide 23 and the connecting part 24, and a resilient sealing element 67 is used, for which there is a free space available in the connecting part 24 for the yielding of the sealing element 67.

As in the first exemplary embodiment, the receiving housing 21 is prestressed by the spring elements 36 encompassing the fluid guides 23 for a radially outwardly extending adjustment, which is limited by the position of the adjusting means connected to the spindle drive. In this second exemplary embodiment, this adjustment is the position of the rods 57 laterally guided in the receiving housings 59. These rods are supported against the force of the spring elements 36 by the pressure bolt 47 and the cross-bar 55 in threaded engagement with the pressure bolt. By manually turning the pressure bolt 47 using the knurled head 49 in one or the other direction of rotation, the axial position of the rods 57 can be adjusted. The flexible mounting of the rods 57 at the receiving plate 43 of the receiving housing 21 in conjunction with the shown, flexible guidance of the fluid guides 23 at the connecting parts 24 of the drive shaft 20 permits compensating motions, such as a tilt angle of plus/minus 1 degree of the end plate 41 of the receiving housing 21 in a plane parallel to the axis of the drive shaft 20. FIGS. 5 and 8 and 9 show for each guide housing 59 a toggle drive or toggle 69, which is attached to the end of the relevant guide housing 59 facing the receiving housing 21 and can be actuated manually to lock the position of the rod 57 by clamping.

The filter device according to the invention can be used for other applications for which it is suitable in addition to the filtration of lubricating oil. In addition to the already mentioned maritime usage in which ballast water of ships is purified, the device can also be used for the treatment of process water.

While various embodiments have been chosen to illustrate the invention, it will be understood by those skilled in the art that various changes and modifications can be made therein without departing from the scope of the invention as defined in the claims.

The invention claimed is:

1. A filter device, comprising:
   a filter housing having a fluid inlet for unfiltered matter and a fluid outlet for filtered matter;
   a filter element in the filter housing;
   a first backwash element located in a receiving housing and arranged to clean the filter element with a fluid flow through the filter element counter to a filtration flow direction through the filter element in the filter housing, the first backwasher element being movable by a fluid-conveying drive shaft of a rotary drive located inside the filter element, the first backwasher element having a gap-shaped passage opening extending parallel to an axis of rotation of the drive shaft at an end of the first backwasher element adjacent an inside surface of the filter element, the passage opening into a flow chamber connected in fluid communication to the drive shaft;
   an adjustable connection movably guided in a first guide housing on an outside of the drive shaft and located between the receiving housing and the drive shaft adjustably setting a distance between the first backwasher element and the inside surface of the filter element;
   a spring element biasing the first backwasher element in a direction of the inside surface of the filter element.

2. A filter device according to claim 1 wherein
   the adjustable connection comprises a spindle drive being manually actuatable from a side of the drive shaft and extending from an opposite side of the drive shaft to a coupling on the receiving housing.

3. A filter device according to claim 2 wherein
the spindle drive comprises a spindle adjustable by moving in the first guide housing outside of the drive shaft.

4. A filter device according to claim 2 wherein
free ends of a receiving plate connects the spindle drive to the receiving housing allowing tilting of the receiving housing relative to the spindle drive and maintaining a distance between the receiving housing and the spindle drive in a direction of the drive shaft.

5. A filter device according to claim 4 wherein
the spindle drive comprises first and second spindle rods being guided for movement in the first guide housing and a second guide housing, respectively, the outside of the drive shaft, being lockable in an adjustment setting by a toggle and being connected to the receiving plate.

6. A filter device according to claim 1 wherein
a second backwasher element is in the receiving housing with the first backwasher element first and second fluid guides receiving therein the first and second backwasher elements, respectively, and guiding longitudinal movement of the first and second backwasher elements in every traversing positon thereof of the receiving housing relative to an inner fluid guide of the drive shaft.

7. A filter device according to claim 6 wherein
the adjustable connection comprises a spindle drive being manually actuatable from a side of the drive shaft and extending from an opposite side of the drive shaft to a coupling on the receiving housing; and
the spindle drive acts on the receiving housing between the first and second fluid guides.

8. A filter device according to claim 1 wherein
a second guide housing is mounted on the outside of the drive shaft;
the adjustable connection comprises a second spindle, the first and second spindles being longitudinally movable in the first and second guide housings, respectively, and
the spring element is between the first and second guide housings and housing parts of the receiving housing.

9. A filter device according to claim 1 wherein
the spring element allows compensating motions of the receiving housing relative to the passage opening of the first backwasher element.

10. A filter device according to claim 9 wherein
the compensating motions are in a direction parallel to an adjusting direction of the setting of the distance between the first backwasher element and the inside surface of the filter element and at a tilt angle to the adjusting direction.

11. A filter device according to claim 10 wherein
a second backwasher element is in the receiving housing with the first backwasher element moving toward the filter element and with the second backwasher element moving away from the filter element when the receiving housing is tilted at the tilt angle.

12. A filter device according to claim 10 wherein
the spring element comprises a compression spring providing the compensating motions in the direction parallel to the adjusting direction; and
an elastically yielding sealing element of a fluid guide attached to the drive shaft and receiving the first backwashing element provides tilting at the tilt angle.

13. A filter device, comprising:
a filter housing having a fluid inlet for unfiltered matter and a fluid outlet for filtered matter;
a filter element in the filter housing;
a first backwash element located in a receiving housing and arranged to clean the filter element with a fluid flow through the filter element counter to a filtration flow direction through the filter element in the filter housing, the first backwasher element being movable by a fluid-conveying drive shaft of a rotary drive located inside the filter element, the first backwasher element having a gap-shaped passage opening extending parallel to an axis of rotation of the drive shaft at an end of the first backwasher element adjacent an inside surface of the filter element, the passage opening into a flow chamber connected in fluid communication to the drive shaft; and
an adjustable connection between the receiving housing and the drive shaft adjustably setting a distance between the first backwasher element and the inside surface of the filter element, the adjustable connection including a spindle drive being manually actuatable from a side of the drive shaft, extending from an opposite side of the drive shaft to a coupling on the receiving housing and having a spindle adjustably movable through an inner flow guide of the drive shaft to act on the receiving housing; and
a spring element biasing the first backwasher element in a direction of the inside surface of the filter element.

14. A filter device according to claim 13 wherein
a second backwasher element is in the receiving housing with the first backwasher element first and second fluid guides receiving therein the first and second backwasher elements, respectively, and guiding longitudinal movement of the first and second backwasher elements in every traversing positon thereof of the receiving housing relative to an inner fluid guide of the drive shaft.

15. A filter device according to claim 14 wherein
the spindle drive acts on the receiving housing between the first and second fluid guides.

16. A filter device according to claim 13 wherein
the spring element allows compensating motions of the receiving housing relative to the passage opening of the first backwasher element.

17. A filter device according to claim 16 wherein
the compensating motions are in a direction parallel to an adjusting direction of the setting of the distance between the first backwasher element and the inside surface of the filter element and at a tilt angle to the adjusting direction.

18. A filter device according to claim 17 wherein
a second backwasher element is in the receiving housing with the first backwasher element moving toward the filter element and with the second backwasher element moving away from the filter element when the receiving housing is tilted at the tilt angle.

* * * * *